US 11,827,189 B2

(12) United States Patent
Hamilton et al.

(10) Patent No.: US 11,827,189 B2
(45) Date of Patent: Nov. 28, 2023

(54) SENSOR ASSEMBLY FOR A VEHICLE

(71) Applicant: Ford Global Technologies, LLC, Dearborn, MI (US)

(72) Inventors: Tyler D. Hamilton, Farmington, MI (US); Kunal Chaudhari, Westland, MI (US); Venkatesh Krishnan, Canton, MI (US); Camila Silva, Salvador/Bahia (BR); Michael Robertson, Jr., Garden City, MI (US); Anthony Michael Regalbuto, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/517,719

(22) Filed: Nov. 3, 2021

(65) Prior Publication Data
US 2023/0135961 A1    May 4, 2023

(51) Int. Cl.
| | |
|---|---|
| *B60S 1/56* | (2006.01) |
| *B60S 1/52* | (2006.01) |
| *B60S 1/54* | (2006.01) |
| *G02B 27/00* | (2006.01) |
| *G01S 7/481* | (2006.01) |

(Continued)

(52) U.S. Cl.
CPC .............. *B60S 1/66* (2013.01); *B60R 11/04* (2013.01); *B60S 1/52* (2013.01); *B60S 1/54* (2013.01); *B60S 1/56* (2013.01); *G01S 7/4813* (2013.01); *G01S 7/497* (2013.01);

(Continued)

(58) Field of Classification Search
CPC .............. G01S 7/4813; G02B 27/0006; B60R 11/00–06
See application file for complete search history.

(56) References Cited

U.S. PATENT DOCUMENTS

| | | | |
|---|---|---|---|
| 6,290,361 B1 * | 9/2001 | Berzin | B60S 1/544 359/507 |
| 2003/0155001 A1 * | 8/2003 | Hoetzer | B60S 1/0822 134/52 |

(Continued)

FOREIGN PATENT DOCUMENTS

| | | |
|---|---|---|
| WO | 2021018493 A1 | 2/2021 |
| WO | 2021131520 A1 | 7/2021 |

(Continued)

*Primary Examiner* — Michael E Barr
*Assistant Examiner* — Omair Chaudhri
(74) *Attorney, Agent, or Firm* — Frank A. MacKenzie; Bejin Bieneman PLC

(57) ABSTRACT

A sensor assembly includes a first sensing device and a second sensing device spaced from the first sensing device. The sensor assembly includes a bracket supporting the first sensing device and the second sensing device and a sensor cover including a first sensor window and a second sensor window. The first sensing device has a first field of view through the first sensor window and the second sensing device having a second field of view through the second sensor window. The sensor assembly includes an air nozzle housing supported by the bracket and defining a first air nozzle aimed toward the first sensor window and a second air nozzle aimed toward the second sensor window. The sensor assembly includes a washer nozzle spaced from the first air nozzle. The washer nozzle aimed toward the first sensor window in a direction opposite to a direction of the first air nozzle.

19 Claims, 7 Drawing Sheets

(51) Int. Cl.
  *B60S 1/66*     (2006.01)
  *G01S 7/497*    (2006.01)
  *B60R 11/04*    (2006.01)
  *H04N 23/51*    (2023.01)

(52) U.S. Cl.
  CPC ......... *G02B 27/0006* (2013.01); *H04N 23/51* (2023.01); *G01S 2007/4977* (2013.01)

(56) References Cited

U.S. PATENT DOCUMENTS

| | | | | |
|---|---|---|---|---|
| 2015/0183406 | A1* | 7/2015 | Tanaka | B08B 3/02 134/99.1 |
| 2015/0353057 | A1* | 12/2015 | Witte | B60S 1/0848 134/115 R |
| 2017/0297536 | A1* | 10/2017 | Giraud | G02B 27/0006 |
| 2018/0015908 | A1* | 1/2018 | Rice | B60S 1/56 |
| 2018/0126921 | A1* | 5/2018 | Koseki | B08B 5/02 |
| 2018/0265049 | A1* | 9/2018 | Schmidt | B60S 1/54 |
| 2018/0361997 | A1* | 12/2018 | Schmidt | G02B 27/00 |
| 2019/0054855 | A1* | 2/2019 | Krishnan | B60Q 1/2661 |
| 2019/0077376 | A1* | 3/2019 | Baldovino | B60S 1/52 |
| 2019/0184942 | A1* | 6/2019 | Vaishnav | B08B 1/04 |
| 2020/0114851 | A1* | 4/2020 | Agarwal | G01S 17/931 |
| 2020/0307524 | A1* | 10/2020 | Morita | B60S 1/54 |
| 2021/0063093 | A1* | 3/2021 | Tobiassen | G01S 7/4813 |
| 2021/0094079 | A1 | 4/2021 | Krishnan et al. | |
| 2021/0179032 | A1* | 6/2021 | Vitanov | B08B 3/02 |
| 2021/0339710 | A1* | 11/2021 | Adams | B08B 3/02 |
| 2022/0009453 | A1* | 1/2022 | Rachow | B05B 15/65 |
| 2022/0032878 | A1* | 2/2022 | Shawgo | G01S 7/4813 |
| 2022/0111822 | A1* | 4/2022 | Matsunaga | G02B 27/0006 |
| 2022/0132004 | A1* | 4/2022 | Kanitz | B60R 11/04 |
| 2022/0306049 | A1* | 9/2022 | Badanov | B60S 1/54 |

FOREIGN PATENT DOCUMENTS

| | | | | |
|---|---|---|---|---|
| WO | | 2021137884 | A1 | 7/2021 |
| WO | WO-2021131520 | A1 * | 7/2021 | ............ G01S 17/86 |
| WO | WO-2022083491 | A1 * | 4/2022 | ............ B60S 1/0822 |

\* cited by examiner

SENSOR ASSEMBLY FOR A VEHICLE

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. A lidar device detects distances to objects by emitting laser pulses and measuring the time of flight for the pulse to travel to the object and back.

DETAILED DESCRIPTION

Figure 1:
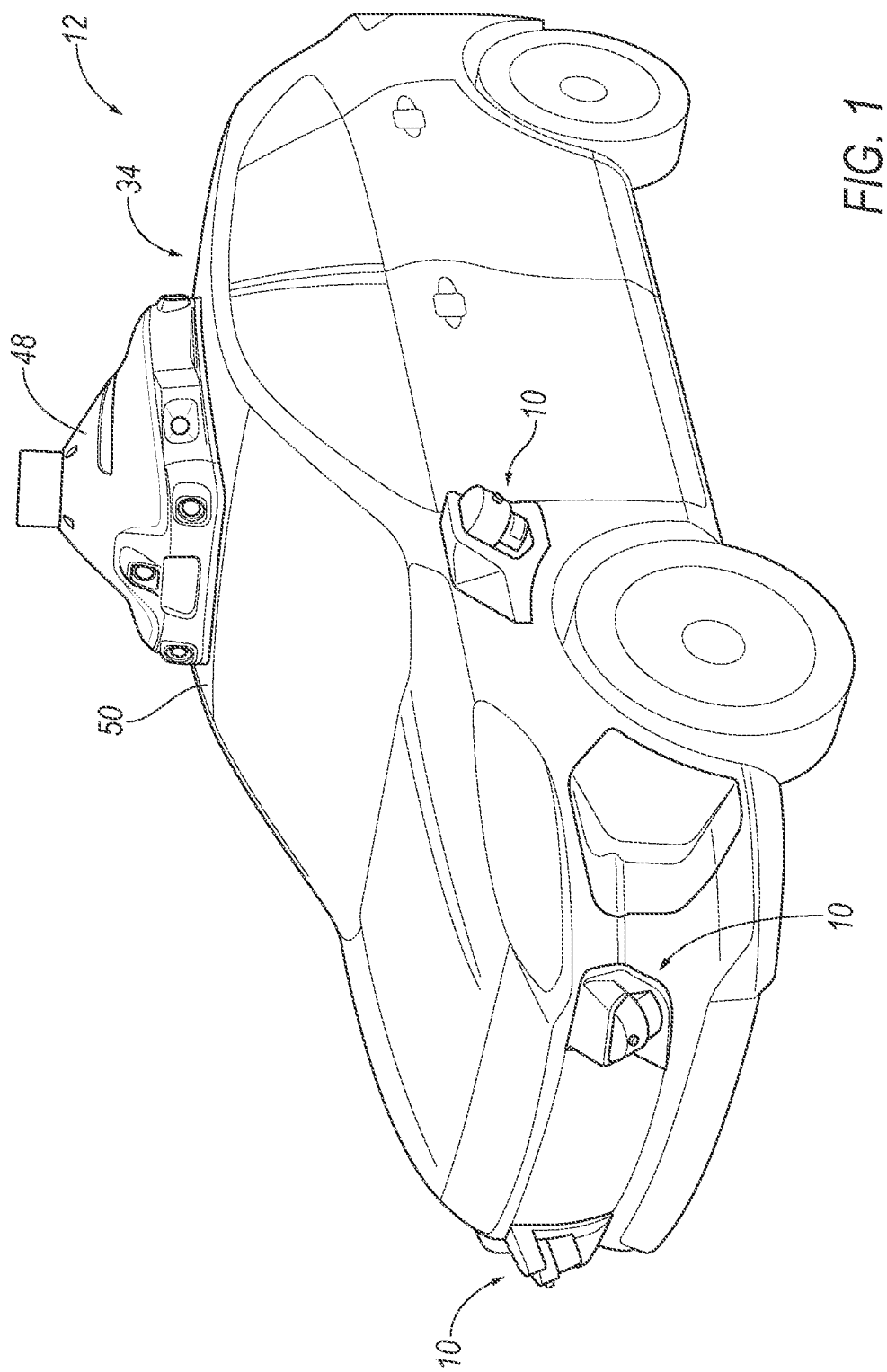
FIG. 1 is a perspective view of an example vehicle including a plurality of sensor assemblies.

A sensor assembly includes a first sensing device and a second sensing device spaced from the first sensing device. The sensor assembly includes a bracket supporting the first sensing device and the second sensing device. The sensor assembly includes a sensor cover including a first sensor window and a second sensor window. The first sensing device has a first field of view through the first sensor window and the second sensing device has a second field of view through the second sensor window. The sensor assembly includes an air nozzle housing supported by the bracket. The air nozzle housing defines a first air nozzle aimed toward the first sensor window and a second air nozzle aimed toward the second sensor window. The sensor assembly includes a washer nozzle spaced from the first air nozzle, the washer nozzle aimed toward the first sensor window in a direction opposite to a direction of the first air nozzle.

The direction at which the washer nozzle may be aimed is downwardly toward the first sensor window and the direction at which the first air nozzle is aimed is upwardly toward the first sensor window.

The washer nozzle may be spaced upwardly from the first air nozzle.

The sensor assembly may include a second washer nozzle spaced from the washer nozzle, the second washer nozzle aimed toward the second sensor window.

The first air nozzle may be aimed in a direction opposite a direction of the second air nozzle.

The washer nozzle and the first air nozzle may be vehicle-outboard of the bracket.

The sensor assembly may include an air inlet fluidly connected to the first air nozzle and the second air nozzle.

The sensor assembly may include a blower positioned to receive airflow from the air inlet and to blow the airflow into the first air nozzle and the second air nozzle.

The air nozzle housing may define a duct extending from the blower to the first air nozzle and the second air nozzle.

The air inlet, the first air nozzle and the second air nozzle, the blower, and the duct may define a flow path extending from the air inlet to the first air nozzle and the second air nozzle.

The bracket may be a single piece.

The bracket may be supportable by a vehicle body.

The first sensing device may be a camera and the first sensor window includes a lens.

The second sensing device may be a lidar sensing device.

The second sensing device may be cylindrical and elongated along an axis, the second air nozzle extending around the axis along the second sensing device.

The air nozzle housing may include an air nozzle cover extending at least partially around the axis, the air nozzle cover including the first air nozzle.

The air nozzle cover includes a scoop spaced from the axis and aimed toward the first sensor window.

The second sensing device may extend downwardly from the bracket.

The first sensing device may be positioned on an opposite side of the bracket from the first sensing device.

With reference to the Figures, wherein like numerals indicate like parts throughout the several views, a sensor assembly 10 for a vehicle 12 includes a first sensing device 14 and a second sensing device 16 spaced from the first sensing device 14. The sensor assembly 10 includes a bracket 18 supporting the first sensing device 14 and the second sensing device 16 and a sensor cover 20 including a first sensor window 22 and a second sensor window 24. The sensing devices 14, 16 can include devices such as optical cameras, lidar, radar, etc. The first sensing device 14 has a first field of view through the first sensor window 22 and the second sensing device 16 having a second field of view through the second sensor window 24. The sensor assembly 10 includes an air nozzle housing 26 supported by the bracket 18. The air nozzle housing 26 defines a first air nozzle 28 aimed toward the first sensor window 22 and a second air nozzle 30 aimed toward the second sensor window 24. The sensor assembly 10 includes a washer nozzle 32 spaced from the first air nozzle 28. The washer nozzle 32 is aimed toward the first sensor window 22 in a direction opposite a direction of the first air nozzle 28.

The air nozzles 28, 30 and the washer nozzle 32 can be used to clear debris from the sensing devices 14, 16 after debris comes into contract with the sensing devices 14, 16. The air nozzles 28, 30 can limit the amount of debris that contact with the sensing devices 14, 16, and the washer nozzles 32, 44 can remove at least some debris that is not removed by the air nozzles 28, 30. The first air nozzle 28 and the washer nozzle 32 aimed in a direction opposite the direction in which the first air nozzle 28 is aimed advantageously to allow the first sensing device 14 to be packaged and assembled above the second sensing device 16. Advantageously, having the first air nozzle 28 aimed in a direction opposite the direction of the washer nozzle 32 allows for installation of the first sensing device 14 during manufacturing and assembly of the sensor assembly 10 and a vehicle 12. For example, the first air nozzle 28 being on an opposite side of the first sensing device 14 from the washer nozzle 32 can allow for the first sensing device 14 to be installed above the air nozzle housing 26 to provide installation space for connectors of the first sensing device 14 to extend from a backside of the first sensing device 14. This placement of the first sensing device 14 allows for air to move below the first sensing device 14 and upward from the first air nozzle 28 and toward the first sensing device 14. The locations of the first air nozzle 28 and the washer nozzle 32 allow for airflow to reach the first sensing device 14 to provide cleaning as described above, and further provide for assembly of the sensor assembly 10.

With reference to FIG. 1, the vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input, e.g., based on data received from the first sensing device 14, the second sensor, and the third sensing device.

Figure 2:
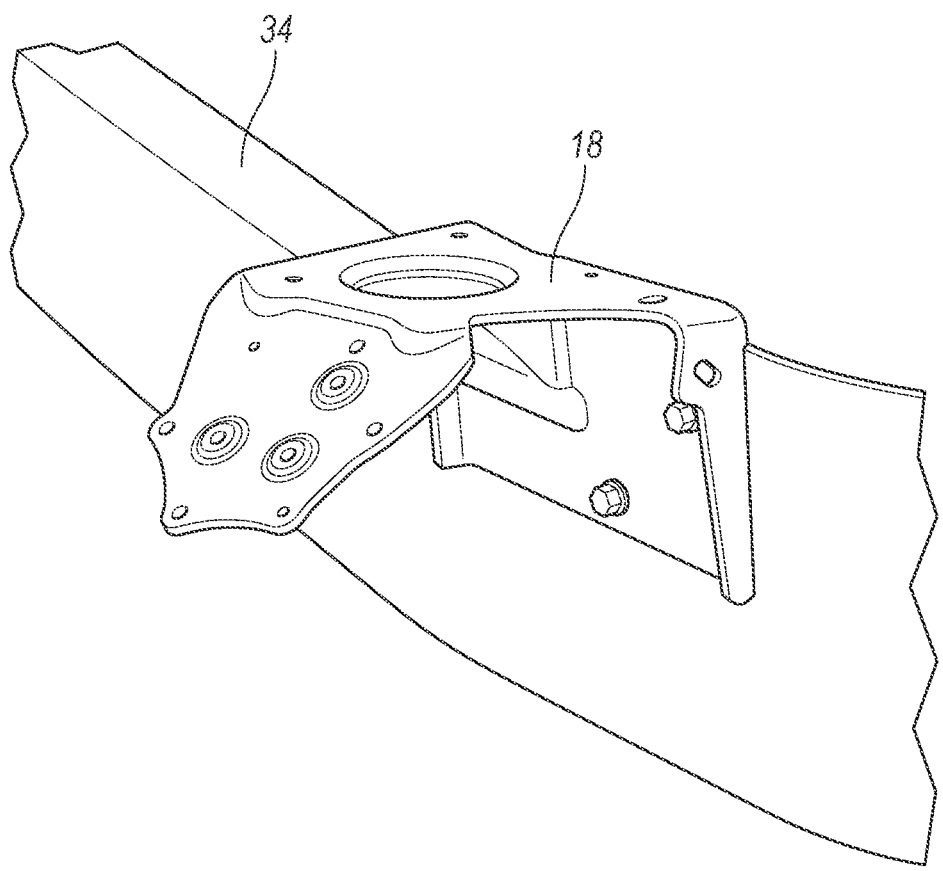
FIG. 2 is a perspective view of an example bracket for attaching the sensor assembly to a body of the vehicle.

With reference to FIGS. 1 and 2, the vehicle 12 includes a body 34. The vehicle 12 may be of a unibody construction, in which a frame and the body 34 of the vehicle 12 are a single component. The vehicle 12 may, alternatively, be of a body-on-frame construction, in which the frame supports the body 34 that is a separate component from the frame. The frame and body 34 may be formed of any suitable material, for example, steel, aluminum, etc. The body 34 includes body 34 panels partially defining an exterior of the vehicle 12. The body 34 panels may present a class-A surface, e.g., a finished surface exposed to view by a customer and free of unaesthetic blemishes and defects.

With continued reference to FIGS. 1 and 2, the sensor assembly 10 is supported by the body 34 of the vehicle 12. Specifically, the sensor assembly 10 includes the bracket 18 and the bracket 18 is supportable by the body 34 of the vehicle 12, i.e., the sides of the vehicle 12. For example, the sensor assembly 10 may be disposed on a front end of the vehicle 12 below a beltline of the vehicle 12, as shown in FIG. 1. While the description herein may refer to a single sensor assembly 10, as illustrated in FIG. 1, the vehicle 12 may include multiple sensor assemblies 10, each disposed at a different locations on the vehicle 12, i.e., different locations on the body 34. The sensor assemblies 10 may be arranged to provide the sensing devices 14, 16 with a collective or combined field of view entirely around a front end of the vehicle 12, for example.

In addition to the sensor assemblies 10 along the sides of the vehicle 12, the vehicle 12 may include a rooftop sensor assembly 48 supported by the roof 50 of the vehicle 12. The rooftop sensor assembly 48 may include sensing devices (not numbered) for a field of view around the vehicle 12 from the roof 50 of the vehicle 12. The rooftop sensor assembly 48 may operate in combination with the sensor assemblies 10 around the vehicle 12 to provide a collective or combined field of view entirely around the vehicle 12, for example.

As discussed above, the bracket 18 is supported by the body 34 of the vehicle 12 e.g., bolted to the body 34 of the vehicle 12 or mounted in any suitable way, and is thereby fixed relative to the sensor cover 20. The bracket 18 may extend in an outward direction (sometimes referred to as vehicle-outboard) from the body 34 of the vehicle 12. The bracket 18 is a single or unitary part, i.e., made of a single, uniform piece of material with no seams, joints, fasteners, or adhesives holding it together.

With reference to FIGS. 3-6, the sensor assembly 10 includes one or more sensing devices 14, 16 supported by the bracket 18. In the example shown in the Figures, the sensor assembly 10 includes the first sensing device 14 and the second sensing device 16.

The first sensing device 14 and the second sensing device 16 are each supported by the bracket 18. The bracket 18 fixes the position of the sensing device relative to the sensor cover 20, including relative to the bracket 18. For example, the sensing devices 14, 16 may be press-fitted into an opening through the bracket 18 and/or may be fixed by fasteners, e.g., screws, bolts, etc. The sensing devices 14, 16 may be directly supported by the bracket 18 or indirectly supported by the bracket 18. In the present context, directly means that no other vehicle components are between the sensing devices 14, 16 and the bracket 18; indirectly means that other vehicle components may be between the sensing devices 14, 16 and the bracket 18. For example, the first sensing device 14 is indirectly supported by the bracket 18 by the air nozzle housing 26 and the second sensing device 16 is directly supported by the bracket 18 by being press-fitted into the opening in the bracket 18.

The first sensing device 14 and the second sensing device 16 are spaced from each other. When the sensor assembly 10 is in an orientation in which it is or will be installed on a vehicle 12, the first sensing device 14 may be spaced upwardly from the second sensing device 16 relative to the bracket 18 of the senor assembly 10. The first sensing device 14 may be positioned on an opposite side of the bracket 18 from the first sensing device 14, i.e., the first sensing device 14 may be upward of the bracket 18 and the second sensing device 16 may be downward from the bracket 18.

The sensing devices 14, 16 detect the external world, e.g., objects and/or characteristics of surroundings of the vehicle 12, such as other vehicles 12, road lane markings, traffic lights and/or signs, pedestrians, etc. For example, the sensing devices 14, 16 can be radar sensors, scanning laser range finders, light detection and ranging (lidar) sensing devices, or an image processing sensor such as a camera. In one example, the first sensing device 14 is a camera and the second sensing device 16 is a lidar sensing device.

In such examples where the first sensing device 14 is a camera, the first sensor window 22 may include a lens 46. In other words, the first field of view through the first sensor window 22 is through the lens 46 of the camera.

The lidar sensing device is similar to radar but uses laser light transmissions instead of radio transmissions to obtain reflected light pulses from objects. The reflected light pulses can be measured to determine object distances. Data from a lidar can be provided to generate a three-dimension representation of detected objects, sometimes referred to as a point cloud.

In such examples where the second sensing device 16 is a lidar sensing device, the second sensing device 16 may be cylindrical. The second sensing device 16 extends downwardly from the bracket 18 and may be elongated along an axis A.

Figure 3:
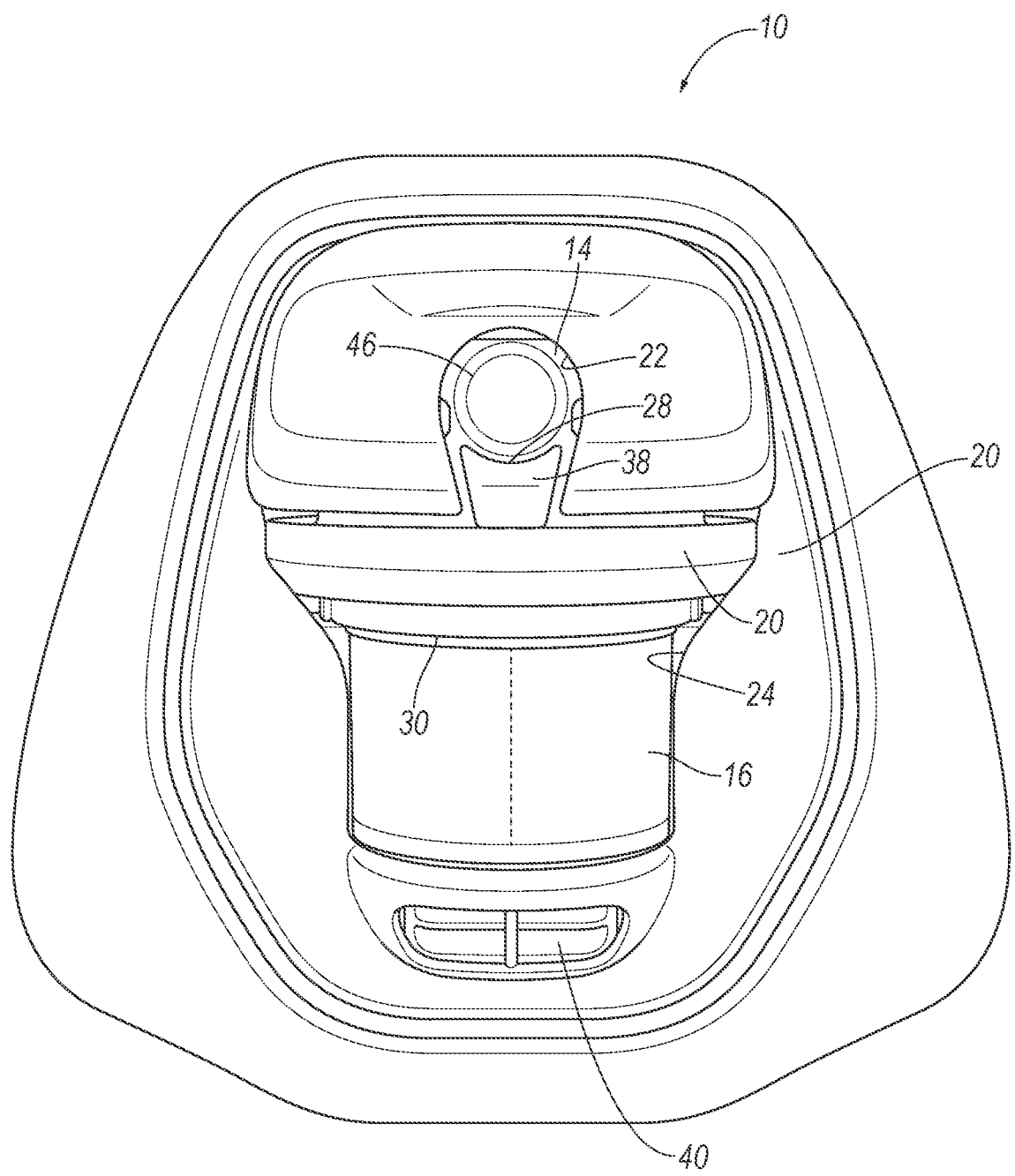
FIG. 3 is a frontal view of the sensor assembly shown in FIG. 1.
Figure 5:
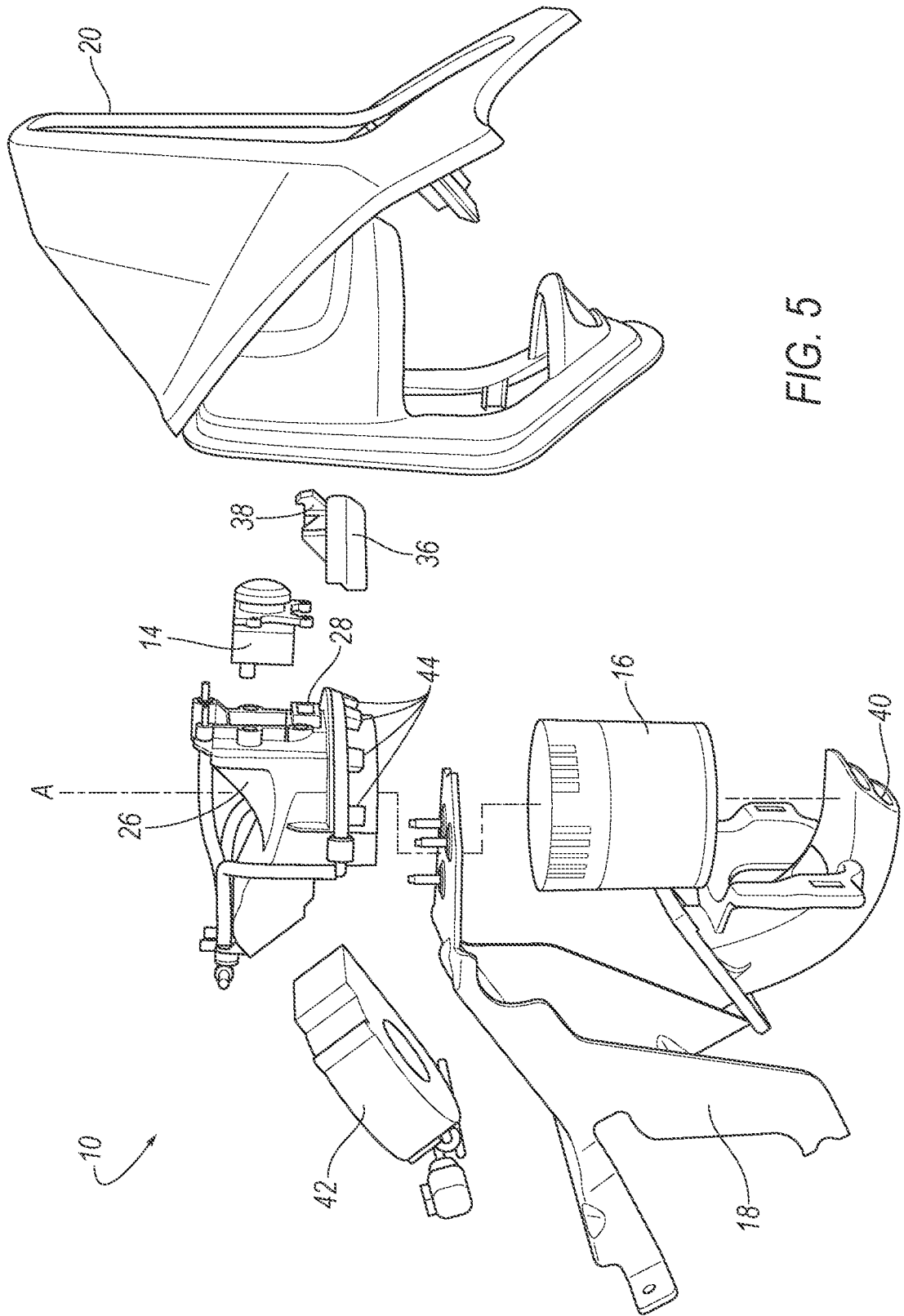
FIG. 5 is an exploded view of the sensor assembly of FIG. 3.
Figure 6:
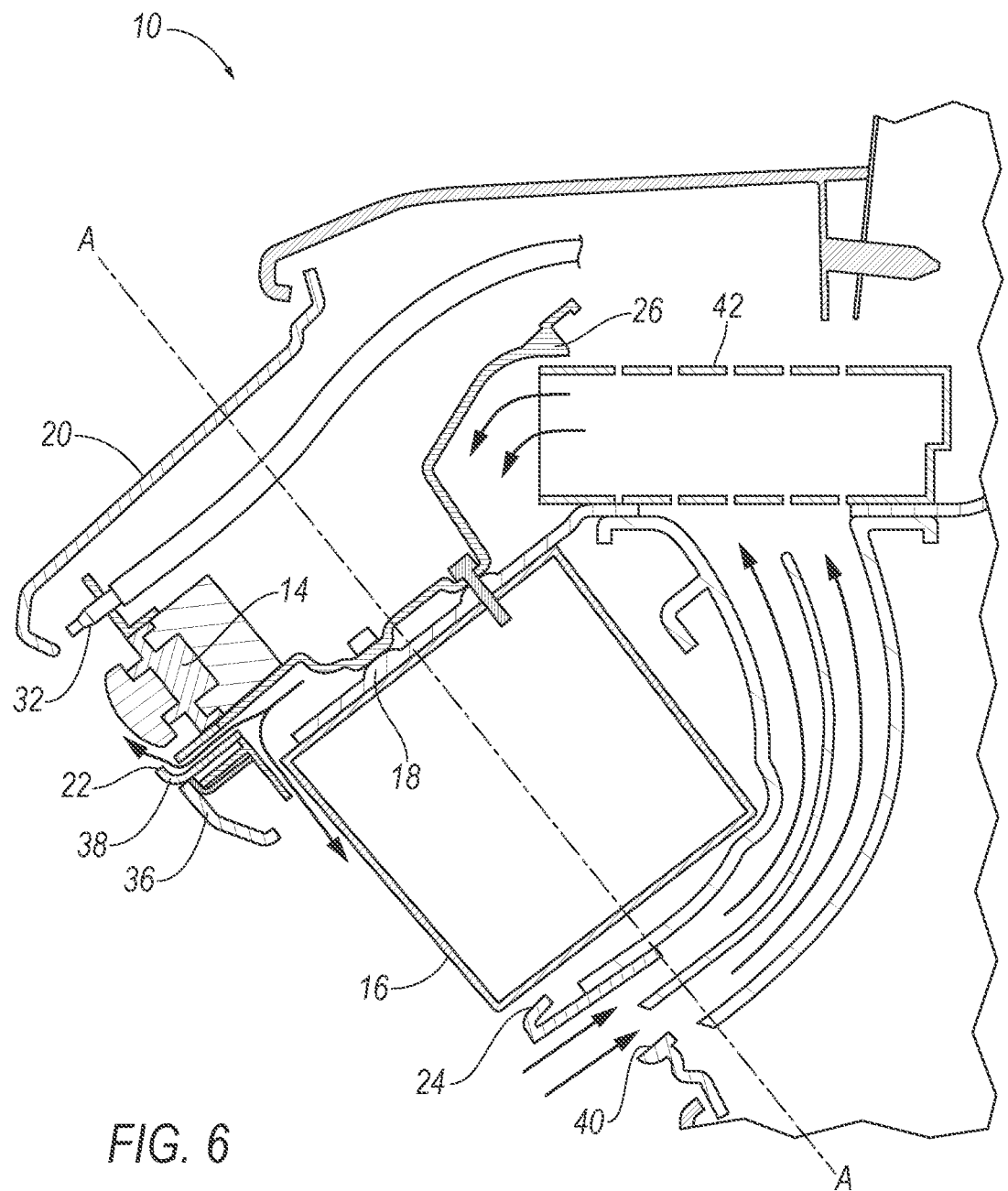
FIG. 6 is a cross-sectional view of the sensor assembly of FIG. 3.

With reference to FIGS. 3, 5, and 6, the sensor assembly 10 includes the sensor cover 20. The sensor cover 20 may have a class-A surface, i.e., the sensor cover 20 may be a finished surface exposed to view by a customer and free of unaesthetic blemishes and defects. The sensor cover 20 may be disposed over other components of the sensor assembly 10, e.g., the bracket 18 and the sensing devices 14, 16. The bracket 18 and other components of the sensor assembly 10 may be between the sensor cover 20 and the body 34 of the vehicle 12. The sensing devices 14, 16 may be between the sensor cover 20 and the bracket 18.

The sensor cover 20 includes the first sensor window 22 and the second sensor window 24. The sensing devices 14, 16 may be positioned to have fields of view through the sensor windows 22, 24. The first sensing device 14 can have a first field of view through the first sensor window 22 and the second sensing device 16 has a second field of view through the second sensor window 24. The sensing devices 14, 16 may detect the external world through the fields of view.

Figure 4A:
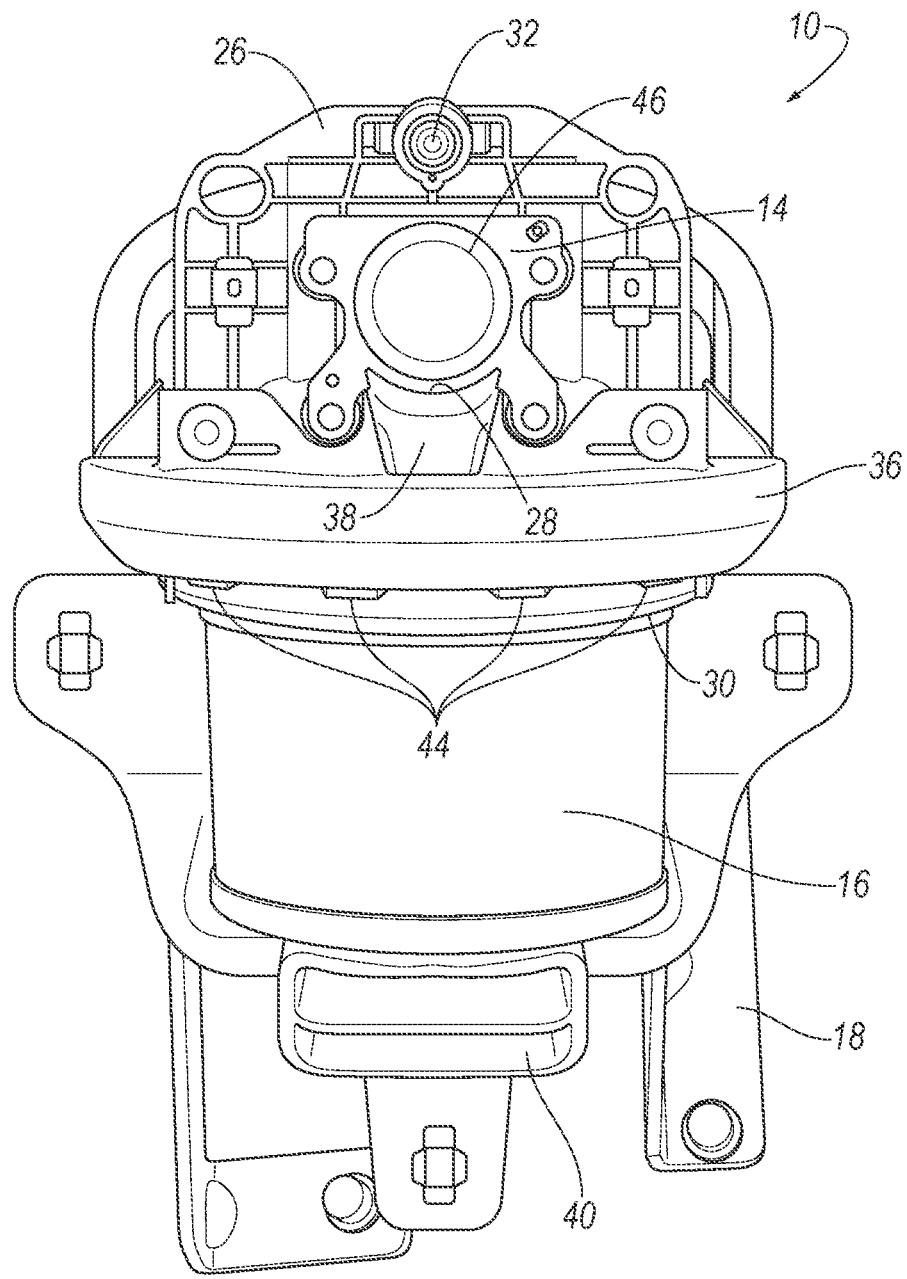
FIG. 4A is a frontal view of the sensor assembly with a sensor cover removed from the sensor assembly.
Figure 4B:
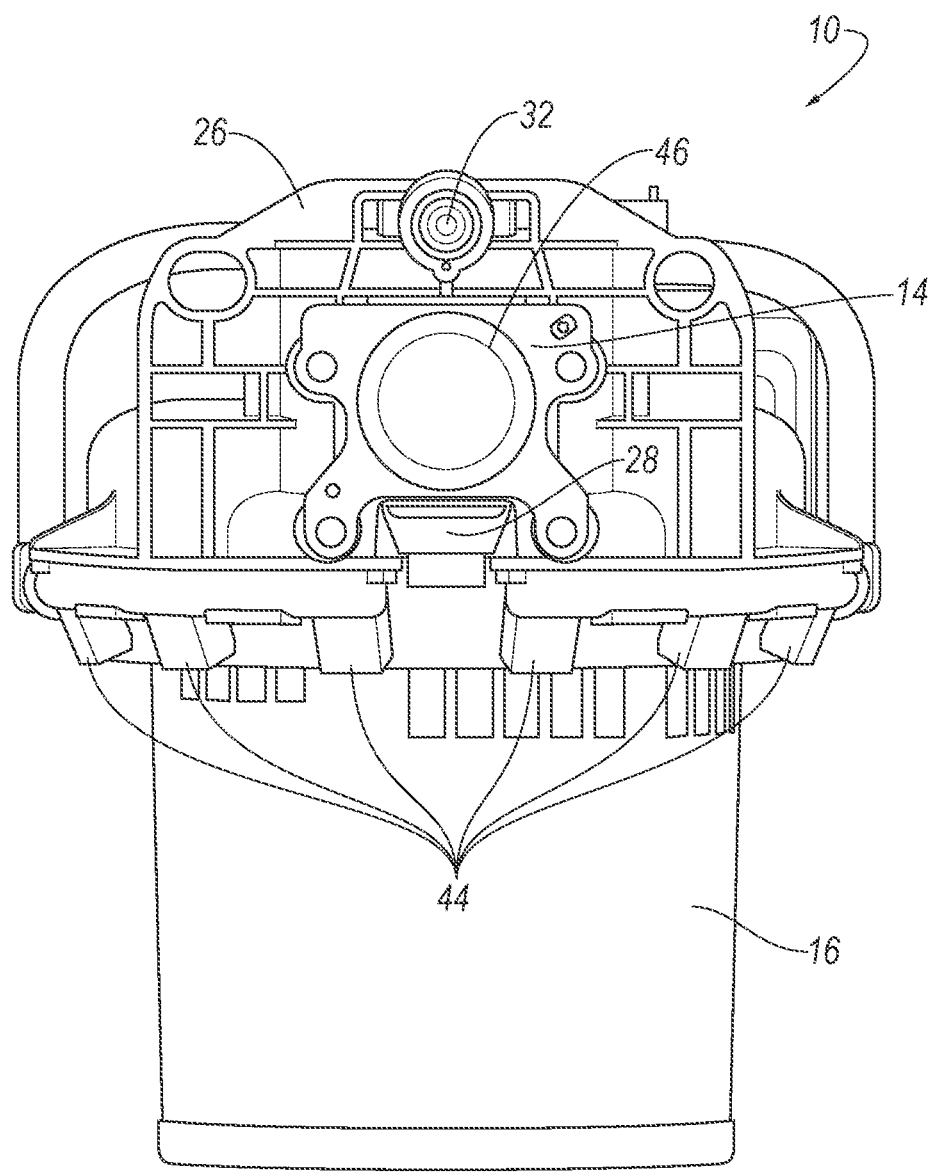
FIG. 4B is a frontal view of the sensor assembly with an air nozzle cover removed from the sensor assembly.

With reference to FIGS. 4A and 4B, the sensor assembly 10 includes the air nozzle housing 26 supported by the bracket 18. The air nozzle housing 26 may be supported on an opposite side of the bracket 18 from the second sensing device 16, i.e., in an installation orientation of the sensor assembly 10, the air nozzle housing 26 may be above the bracket 18 and the second sensing device 16 may be below the bracket 18. The air nozzle housing 26 may be supported on the same side of the bracket 18 as the first sensing device 14. The air nozzle housing 26 may be, such as in the example shown in the Figures, supported by the bracket 18 between the first sensing device 14 and the bracket 18. In other words, the first sensing device 14 may be supported by the air nozzle housing 26.

The air nozzle housing 26 may define air nozzles 28, 30 aimed toward the sensor windows 22, 24. The air nozzles 28, 30 allow air to pass across the sensor windows 22, 24 and the sensing devices 14, 16 to block debris, e.g., insects, dust, pollen, dirt, rain, etc., from landing on the sensor windows 22, 24, whereby the debris can at least partly block the fields of view. The air nozzles 28, 30 may act as a shield or "curtain" to block debris that otherwise could land on or contact the sensor windows 22, 24. The air nozzle housing 26 may define a duct to allow air to move through the air nozzle housing 26 and through the sensor windows 22, 24. The air nozzle housing 26 may define a first air nozzle 28 aimed toward the first sensor window 22 and a second air nozzle 30 aimed toward the second sensor window 24. Because the first sensing device 14 and the second sensing device 16 are spaced from each other and on opposite sides of the bracket 18, the first air nozzle 28 is aimed in a direction opposite a direction of the second air nozzle 30. In other words, as shown in the example in the Figures, the first air nozzle 28 may be aimed upwardly at the first sensing device 14 and first sensor window 22, and the second air nozzle 30 may be aimed downwardly at the second sensing device 16 and the second sensor window 24. The first air nozzle 28 can then direct air in a direction away from the direction of the second air nozzle 30, i.e., the first air nozzle 28 directs air at the first sensor window 22 to prevent and remove debris from the first sensor window 22 and the second air nozzle 30 directs air at the second sensor window 24 to prevent accumulation of, and/or remove, debris from the second sensor window 24.

The first air nozzle 28 may be positioned at a forward portion of the air nozzle housing 26, directly below the first sensor window 22. The first air nozzle 28 allows air to pass across the first sensor window 22 and first sensing device 14. In other words, the air from the first air nozzle 28 passes from one side of the first sensor window 22 to the other side of the first sensor window 22, generally along a plane defined by or parallel to a plane defined by the first sensor window 22. The first air nozzle 28 may move air across the first sensor window 22 and the first sensing device 14 to remove debris or prevent debris from reaching the first sensor window 22. The air nozzle housing 26 may include an air nozzle cover 36 extending at least partially around the axis A along which the second sensing device 16 is elongated. The air nozzle cover 36 may extend around the front portion of the sensor assembly 10 and the second sensing device 16.

The air nozzle cover 36 may include the first air nozzle 28 aimed toward the first sensor window 22. As shown in the example in the Figures, the air nozzle cover 36 may include a scoop 38 spaced from the axis A. The scoop 38 may be aimed toward the first sensor window 22. The scoop 38 may protrude from the front of the sensor assembly 10 to direct air toward the first sensor window 22.

The second air nozzle 30 may extend around the axis A and along the second sensing device 16. In other words, the second air nozzle 30 may extend around the axis A and along an upper edge of the second sensing device 16. The second air nozzle 30 may have a semi-circular shape extending around the upper edge of the second sensing device 16. The second air nozzle 30 may prevent debris from reaching the second sensing device 16. The second air nozzle 30 may extend around the cylindrical second sensing device 16 and direct air across the second sensor window 24 and the second sensing device 16. In other words, the second air nozzle 30 directs air downward across the second sensing device 16, i.e., from the upper edge of the second sensing device 16 and downwardly relative to the bracket 18.

The sensor assembly 10 includes an air inlet 40 fluidly connected to the first air nozzle 28 and the second air nozzle 30. The air inlet 40 draws in air from an exterior of the vehicle 12 and the sensor assembly 10 to move air through the first air nozzle 28 and the second air nozzles 30. In other words, the air inlet 40 intakes air from outside of the vehicle 12 and the sensor assembly 10 to move through the air nozzles 28, 30. The air inlet 40 may be below the second sensing device 16. The air is drawn into the sensor assembly 10 through the air inlet 40 from the exterior of the vehicle 12 and the sensor assembly 10. The air moves upward into the sensor assembly 10 to move the air through the air nozzles 28, 30.

With reference to FIGS. 3 and 6, the sensor assembly 10 may include a blower 42 between the air inlet 40 and the air nozzles 28, 30 to move air from the exterior of the vehicle 12, through the air nozzles 28, 30, and toward the sensor windows 22, 24 of the sensing devices 14, 16. The blower 42 is supported by the bracket 18 of the sensor assembly 10. The blower 42 is positioned to receive airflow from the air inlet 40 and to blow the airflow into the air nozzles 28, 30. The duct of the air nozzle housing 26 may extend from the blower 42 to the air nozzles 28, 30. The air inlet 40, the air nozzles 28, 30, the blower 42, and the duct define a flow path extending from the air inlet 40 to the air nozzles 28, 30. The flow path may be evidenced by the arrows shown in FIG. 6 showing the direction of airflow through the sensor assembly 10. In other words, air may flow from the exterior of the vehicle 12, through the air inlet 40, through the blower 42, through the duct, and out the air nozzles 28, 30 toward the sensor windows 22, 24.

The sensor assembly 10 includes one or more washer nozzles 32, 44 aimed at the sensor windows 22, 24. The washer nozzles 32, 44 may be connected to washer fluid from the vehicle 12. The washer nozzles 32, 44 are used to clean debris that may be blocking the fields of view of the sensing device. In the example shown in the Figures, the sensor assembly 10 includes a first washer nozzle 32 aimed toward the first sensing device 14 and the first sensor window 22 and at least one second washer nozzle 44 aimed toward the second sensing device 16 and the second sensor window 24. As shown in the Figures, the sensor assembly 10 may include a plurality of second washer nozzles 44 aimed toward the second sensor window 24.

The first washer nozzle 32 and the first air nozzle 28 are vehicle-outboard of the bracket 18. In other words, the first washer nozzle 32 and the first air nozzle 28 may be on the front side of the sensor assembly 10, i.e., vehicle-outboard of the bracket 18. The first washer nozzle 32 is spaced upwardly from the first air nozzle 28. In other words, the first washer nozzle 32 is on an opposite side of the first sensing device 14 and first sensor window 22 from the first air nozzle 28. The first washing device may be above the first sensing device 14 and the first air nozzle 28 may be below the first sensing device 14. Because the first washing device and the first air nozzle 28 are on opposite sides of the first sensing device 14 and first sensor window 22, the first washer nozzle 32 is aimed toward the first sensor window 22 in a direction opposite the direction of the first air nozzle 28. In other words, the first washer nozzle 32 directs washer fluid at the first sensor window 22 and the first air nozzle 28 directs air at the first sensor window 22 in the direction opposite the direction of the first washer nozzle 32. As shown in the Figures, when the sensor assembly 10 is in an installation orientation, the first washer nozzle 32 is aimed downwardly relative to the first sensor window 22 and the first air nozzle 28 is aimed upwardly relative to the first sensor window 22. The first washer nozzle 32 and the first air nozzle 28 operate in combination with each other to prevent debris and remove debris from the field of view of the first sensing device 14. The first air nozzle 28 and the washer nozzle aimed in a direction opposite to the direction of the first air nozzle 28 allows for the first sensing device 14 to be packaged and assembled above the second sensing device 16. The locations of the first air nozzle 28 and the washer nozzle allow for adequate airflow to reach the first sensing device 14 and for assembly of the sensor assembly 10.

The adjectives "first" and "second" are used throughout this document as identifiers for the sensing devices 14, 16, sensor windows 22, 24, air nozzles 28, 30, and washer nozzles 32, 44 and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor assembly comprising:
a first sensing device;
a second sensing device spaced from the first sensing device and having a cylindrical shape defining an axis;
a bracket supporting the first sensing device and the second sensing device;
a sensor cover including a first sensor window and a second sensor window, the first sensing device having a first field of view through the first sensor window and the second sensing device having a second field of view through the second sensor window;
an air nozzle housing supported by the bracket, the air nozzle housing defining a first air nozzle aimed toward the first sensor window and a second air nozzle aimed toward the second sensor window;
a washer nozzle spaced from the first air nozzle, the washer nozzle aimed toward the first sensor window in a direction along the axis opposite to a direction along the axis of the first air nozzle;
a second washer nozzle spaced from the washer nozzle, the second washer nozzle aimed toward the second sensor window in a same direction along the axis as the second air nozzle;
an air inlet spaced along the axis from the first sensing device and the second sensing device, the second sensing device having a position along the axis between the air inlet and the second air nozzle; and
a blower positioned to draw air through the air inlet and expel air to the first air nozzle and second air nozzle, the blower supported by the bracket on an opposite side of the axis from the sensor cover, wherein the opposite side is behind the first sensing device and the second sensing device relative to the sensor cover;
the air inlet allowing air to flow to the blower;
the air nozzle housing defining a duct extending from the blower to the first air nozzle and the second air nozzle, the duct being between the first sensing device and the second sensing device.

2. The sensor assembly of claim 1, wherein the direction at which the washer nozzle is aimed is downwardly toward the first sensor window and the direction at which the first air nozzle is aimed is upwardly toward the first sensor window.

3. The sensor assembly of claim 1, wherein the washer nozzle is spaced upwardly from the first air nozzle.

4. The sensor assembly of claim 1, wherein the first air nozzle is aimed in a direction opposite a direction of the second air nozzle.

5. The sensor assembly of claim 1, wherein the washer nozzle and the first air nozzle are vehicle-outboard of the bracket.

6. The sensor assembly of claim 1, wherein the air inlet, the first air nozzle, the second air nozzle, the blower, and the duct define a flow path extending from the air inlet to the first air nozzle and the second air nozzle.

7. The sensor assembly of claim 1, wherein the bracket is a single piece.

8. The sensor assembly of claim 1, wherein the bracket is supportable by a vehicle body.

9. The sensor assembly of claim 1, wherein the first sensing device is a camera and the first sensor window includes a lens.

10. The sensor assembly of claim 1, wherein the second sensing device is a lidar sensing device.

11. The sensor assembly of claim 1, wherein the second sensing device is elongated along the axis, the second air nozzle extending around the axis along the second sensing device.

12. The sensor assembly of claim 11, wherein the air nozzle housing includes an air nozzle cover extending at least partially around the axis, the air nozzle cover including the first air nozzle.

13. The sensor assembly of claim 12, wherein the air nozzle cover includes a scoop spaced from the axis and aimed toward the first sensor window.

14. The sensor assembly of claim 1, wherein the second sensing device extends downwardly from the bracket.

15. The sensor assembly of claim 1, wherein the first sensing device is positioned on an opposite side of the bracket from the second sensing device.

16. The sensor assembly of claim 1, further comprising a second duct extending from the air inlet to the blower, the second duct being behind the second sensing device.

17. The sensor assembly of claim 1, wherein the blower is supported by the bracket.

18. The sensor assembly of claim 6, further comprising a second duct extending from the air inlet to the blower, and the air inlet, the first air nozzle, the second air nozzle, the blower, the duct, and the second duct define the flow path extending from the air inlet to the first air nozzle and the second air nozzle.

19. The sensor assembly of claim 11, wherein the second sensing device is between the air inlet and the duct along the axis.

* * * * *

UNITED STATES PATENT AND TRADEMARK OFFICE
CERTIFICATE OF CORRECTION

PATENT NO. : 11,827,189 B2
APPLICATION NO. : 17/517719
DATED : November 28, 2023
INVENTOR(S) : Tyler D. Hamilton, Jr. et al.

It is certified that error appears in the above-identified patent and that said Letters Patent is hereby corrected as shown below:

In the Claims

Claim 1, Column 8, Line 20: delete "to" before "flow".

Signed and Sealed this
Second Day of January, 2024

Katherine Kelly Vidal
*Director of the United States Patent and Trademark Office*